United States Patent Office 2,990,389
Patented June 27, 1961

2,990,389
SUPERIOR POLYETHYLENE EMULSIONS
John A. Frump, Terre Haute, Ind., assignor to Commercial Solvents Corporation, New York, N.Y., a corporation of Maryland
No Drawing. Filed May 29, 1959, Ser. No. 816,674
2 Claims. (Cl. 260—23)

My invention relates to an improved process for the production of polyethylene emulsions and more particularly, to a method of production of a stable, clear-non-creaming aqueous polyethylene emulsion.

Because of the great value of polyethylene emulsions as ingredients in many types of polishes, many methods for the formulation of suitable emulsions of this type have been tried in the past. Most of these methods, however, have been unsuccessful in producing a type of aqueous polyethylene emulsion suitable for most purposes for the reason that these prior processes have not given stable, clear, non-creaming aqueous emulsions.

I have now discovered a process for greatly improving the clarity and, at the same time, reducing the creaming in aqueous polyethylene emulsions.

My new process for the production of stable, clear, non-creaming aqueous polyethylene emulsions consists essentially of adding a molten melt of polyethylene containing specific proportions of oleic acid and 2-amino-2-methyl-1-propanol to a small amount of water heated approximately to the boiling point with agitation to form a concentrated emulsion and then diluting this concentrated emulsion with a specific amount of cool water.

I have found that while the amounts of the materials and the operating conditions can be varied slightly conditions for optimum results are relatively critical and cannot be varied over a very wide range. For example, while the amount of oleic acid which can be used satisfactorily in my process can vary from 20 to 23% by weight, based on the polyethylene, optimum results are obtained by the use of 21%. Similarly, the amount of 2-amino-2-methyl-1-propanol which can be used with satisfactory results can vary from 7.2 to 7.7% by weight, based on the polyethylene, with optimum results obtained by the use of 7.5%. The amount of water used in making the concentrated emulsion can vary from 140 to 160% by weight, based on the polyethylene, but optimum results are obtained by the use of 150%. The temperature of the water used to form the concentrated emulsion can vary from 200° F. to 212° F. at atmospheric pressure. However, I have found that optimum results are obtained when the temperature of the water is approximately 210° F. The amount of water added to produce the dilute emulsion can vary upward from 120%, but I have found that an emulsion with the most satisfactory properties is obtained by diluting the concentrated emulsion with approximately 690% by weight, based on the polyethylene, of cool water; for example, at a temperature ranging from 40° F. to 80° F. However, I have found that optimum results are obtained when the temperature of the water is approximately 60° F.

The production of my new polyethylene emulsions is illustrated by the following example.

Example I

To 100 g. of molten polyethylene heated to 240° F. was added 21 g. of oleic acid with agitation. After thorough mixing, 7.5 g. of 2-amino-2-methyl-1-propanol was added. A polyethylene-oleic acid-2-amino-2-methyl-1-propanol melt was next added, with thorough stirring, to 150 g. of water heated to 210 F. To the resulting concentrated emulsion was added 690 g. of water, having a temperature of approximately 60° F. with vigorous stirring. The resulting product was a stable, clear, non-creaming aqueous emulsion of polyethylene.

Now having described my invention what I claim is:

1. In a process for the production of a stable, clear, non-creaming aqueous emulsion of polyethylene, the improvement which comprises mixing molten polyethylene with about 20–23% oleic acid and about 7.2–7.7% 2-amino-2-methyl-1-propanol; agitating the melt until it is uniform; incrementally mixing the melt with about 140–160% of water having a temperature of about 200–212° F.; agitating the resultant mixture until a concentrated uniform emulsion forms; incrementally mixing the concentrated emulsion with more than 120%, all percentages are by weight based on the weight of polyethylene in the melt, of water having a temperature of about 40–80° F. and agitating the resultant mixture until a uniform emulsion forms.

2. The process of claim 1 wherein the amount of oleic acid used is about 21%, the amount of 2-amino-2-methyl-1-propanol used is about 7.5%, the amount of water used to form the concentrated emulsion is about 150% and its temperature is about 210° F.; and the amount of water used to form the dilute emulsion is about 690% and its temperature is about 80° F.

References Cited in the file of this patent
UNITED STATES PATENTS

| | | |
|---|---|---|
| 2,313,144 | Gomm | Mar. 9, 1943 |
| 2,766,214 | Erachak et al. | Oct. 9, 1956 |